US011629212B2

(12) United States Patent
Gerard et al.

(10) Patent No.: US 11,629,212 B2
(45) Date of Patent: Apr. 18, 2023

(54) LIQUID COMPOSITION COMPRISING A PHOUSPHORUS BASED ADDITIVE, ITS USE AND MATERIAL OR COMPOSITION OBTAINED FOLLOWING POLYMERISATION OF COMPOSITION

(71) Applicant: ARKEMA FRANCE, Colombes (FR)

(72) Inventors: Pierre Gerard, Denguin (FR); Pierre Escale, Pau (FR)

(73) Assignee: ARKEMA FRANCE, Colombes (FR)

( * ) Notice: Subject to any disclaimer, the term of this patent is extended or adjusted under 35 U.S.C. 154(b) by 64 days.

(21) Appl. No.: 16/316,360

(22) PCT Filed: Jul. 11, 2017

(86) PCT No.: PCT/EP2017/067377
§ 371 (c)(1),
(2) Date: Jan. 9, 2019

(87) PCT Pub. No.: WO2018/011193
PCT Pub. Date: Jan. 18, 2018

(65) Prior Publication Data
US 2019/0225729 A1   Jul. 25, 2019

(30) Foreign Application Priority Data
Jul. 11, 2016 (FR) ..................... 16 56649

(51) Int. Cl.
| | |
|---|---|
| *C08F 265/06* | (2006.01) |
| *C08J 5/10* | (2006.01) |
| *C08K 5/5313* | (2006.01) |
| *C08J 5/04* | (2006.01) |
| *C08J 5/24* | (2006.01) |
| *C08F 220/14* | (2006.01) |
| *C08L 33/12* | (2006.01) |
| *C08L 51/00* | (2006.01) |
| *C08K 5/00* | (2006.01) |

(52) U.S. Cl.
CPC .......... *C08F 265/06* (2013.01); *C08F 220/14* (2013.01); *C08J 5/04* (2013.01); *C08J 5/10* (2013.01); *C08J 5/249* (2021.05); *C08K 5/5313* (2013.01); *C08L 33/12* (2013.01); *C08L 51/003* (2013.01); *C08J 2333/12* (2013.01); *C08K 5/0066* (2013.01); *C08L 2201/02* (2013.01)

(58) Field of Classification Search
CPC ...... C08F 265/06; C08F 220/14; C08L 33/12; C08L 51/003; C08L 2201/02; C08J 5/10; C08J 5/24; C08J 2333/12; C08K 5/5313; C08K 5/0066

USPC .................................................. 524/126
See application file for complete search history.

(56) References Cited

U.S. PATENT DOCUMENTS

| | | | |
|---|---|---|---|
| 3,900,444 A | 8/1975 | Racky et al. | |
| 4,036,811 A | 7/1977 | Noetzel et al. | |
| 6,548,627 B1 | 4/2003 | Horold | |
| 6,696,513 B1 | 2/2004 | Welton et al. | |
| 9,777,140 B2 | 10/2017 | Gerard et al. | |
| 2005/0143503 A1 | 6/2005 | Bauer et al. | |
| 2007/0299171 A1 | 12/2007 | Couillens et al. | |
| 2014/0309340 A1* | 10/2014 | Schneider | C07F 9/301 523/451 |
| 2014/0329933 A1* | 11/2014 | Schneider | C08K 5/5313 523/451 |
| 2014/0350149 A1* | 11/2014 | Schneider | C07F 9/301 524/133 |
| 2015/0005421 A1* | 1/2015 | Schneider | C07F 9/305 524/126 |
| 2015/0218362 A1 | 8/2015 | Gerard et al. | |
| 2016/0032080 A1* | 2/2016 | Gerard | C08K 5/5313 524/133 |

FOREIGN PATENT DOCUMENTS

| | | | |
|---|---|---|---|
| WO | WO 2014/013028 | * | 1/2014 |
| WO | WO 2014/140465 | * | 9/2014 |

* cited by examiner

*Primary Examiner* — Doris L Lee
(74) *Attorney, Agent, or Firm* — Buchanan Ingersoll & Rooney P.C.

(57) ABSTRACT

The present invention relates to a liquid composition comprising a monomer, a (meth)acrylic polymer and at least one flame-retardant substance (FD1) chosen from a phosphorus-based additive. In particular the present invention it relates to a liquid composition comprising a monomer, a (meth)acrylic polymer and at least one flame-retardant substance (FD1) chosen from a phosphorus-based additive that can be used as a syrup and especially as a syrup for impregnation and for the preparation for improving the fire resistance of a thermoplastic polymer or matrix obtained after polymerization of the syrup. Also concerned is a thermoplastic material obtained after polymerization of the liquid composition or syrup. The invention also relates to a process for manufacturing such a liquid composition or syrup. The invention also relates to a process for impregnating a fibrous substrate of long fibers with said liquid composition or syrup. The invention also relates to a fibrous substrate preimpregnated with said liquid composition or syrup which is useful for manufacturing composite parts. The present invention also relates to a process for manufacturing mechanical parts or structural elements made of composite material and to mechanical parts or structural elements made of composite material obtained via a process using such a liquid composition.

17 Claims, No Drawings

LIQUID COMPOSITION COMPRISING A PHOUSPHORUS BASED ADDITIVE, ITS USE AND MATERIAL OR COMPOSITION OBTAINED FOLLOWING POLYMERISATION OF COMPOSITION

This application claims benefit, under U.S.C. § 119 or § 365 of PCT Application Number PCT/EP2017/067377, filed Jul. 11, 2017, and French Patent Application Number FR1656649, filed Jul. 11, 2016, these documents being incorporated herein by reference.

FIELD OF THE INVENTION

The present invention relates to a liquid composition comprising a monomer, a (meth)acrylic polymer and at least one flame-retardant substance (FD1) chosen from a phosphorus-based additive.

In particular the present invention it relates to a liquid composition comprising a monomer, a (meth)acrylic polymer and at least one flame-retardant substance (FD1) chosen from a phosphorus-based additive that can be used as a syrup and especially as a syrup for impregnation and for the preparation for improving the fire resistance of a thermoplastic polymer or matrix obtained after polymerization of the syrup. Also concerned is a thermoplastic material obtained after polymerization of the liquid composition or syrup. The invention also relates to a process for manufacturing such a liquid composition or syrup. The invention also relates to a process for impregnating a fibrous substrate of long fibers with said liquid composition or syrup. The invention also relates to a fibrous substrate preimpregnated with said liquid composition or syrup which is useful for manufacturing composite parts.

The present invention also relates to a process for manufacturing mechanical parts or structural elements made of composite material and to mechanical parts or structural elements made of composite material obtained via a process using such a liquid composition.

PRIOR ART

Thermoplastic polymers are materials are widely used today in several fields and applications. Moreover, legislation is increasingly demanding that materials be flame-retardant, especially in the construction, aeronautic, automobile or railway sectors. The materials used in public spaces, especially if they are confined, must thus withstand fire resistance tests. Moreover, the environmental constraints also impose that flame-retardant formulations do not contain any halogen, since, during combustion, halogenated flame-retardant agents and acidic and toxic gases risk being released Also mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The purpose of using a composite material is to obtain performance qualities that are not available from each of its constituents when they are used separately. Consequently, composite materials are widely used in several industrial sectors, for instance building, automotive, aerospace, transport, leisure, electronics, and sport notably due to their better mechanical performance (higher tensile strength, higher tensile modulus, higher fracture toughness) and their low density, in comparison with homogeneous materials.

To allow thermoforming and recycling, it is preferred to use thermoplastic polymers also in composite materials.

Thermoplastic polymers consist of linear or branched polymers, which are not crosslinked. The thermoplastic polymers are heated in order to mix the constituents necessary for manufacturing the composite material and are cooled to set the final form. The problem of these molten thermoplastic polymers is their very high viscosity. In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymeric syrup constitutes the matrix of the composite material.

At the time of impregnation, the viscosity of the impregnation syrup must be controlled and adapted so as not to be too fluid or too viscous, so as to impregnate correctly each fiber of the fibrous substrate. When the wetting is partial, depending on whether the syrup is too fluid or too viscous, "naked" zones, i.e. non-impregnated zones, and zones in which drops of polymer form on the fibers, which are the cause of the creation of bubbles, respectively appear. These "naked" zones and these bubbles give rise to the appearance of defects in the final composite material, which are the cause, inter alia, of a loss of mechanical strength of the final composite material.

A liquid composition or syrup comprising a (meth)acrylic monomer and a (methacrylic polymer is described in WO 2013/056845 and WO 2014/013028.

The addition of flame-retardant substances(s) should not, however, disrupt the viscosity of the impregnation syrup, so as to impregnate correctly each fiber of the fibrous substrate and to avoid the appearance of defects in the final composite material. The addition of such flame-retardant agent(s) should also not impair the thermoplastic properties of the thermoplastic material or composite material obtained after polymerization of the preimpregnated fibrous substrate.

Patent application US 2005/0143503 describes a flame-retardant agent in the form of agglomerated particles. The particles consist of 99.99% to 80% of a (di)phosphinate and of 0.01% to 20% of a polymeric binder which may be acrylate-based.

International patent application WO 2005/061606 describes the flame-retardant treatment of a thermoplastic polymer with a mixture of a compound (F1) similar to the phosphinate compound of formula (I) that is used in the present invention, of a compound (F2) which is a product of reaction between phosphoric acid and melamine and/or a product of reaction between phosphoric acid and a melamine condensation derivative and of a compound (F3) which is a melamine condensation derivative.

Patents DE 2447727 and DE 2252258 describe, respectively, polyamides or polyesters that have been rendered flame-retardant with the aid of (di)phosphinates.

Patent application EP 1013713 describes a multilayer structure comprising a layer of a methacrylic composition that has been rendered flame-retardant with the aid of a halogenated compound and a layer of a thermoplastic polymer, such as PVC.

The document WO2014/140465 discloses a liquid (meth) acrylic syrup for impregnation a fibrous substrate comprising a fire retardant substrate.

It is not suggested in any of these documents that the incorporation, into a liquid composition or liquid impregnation (meth)acrylic syrup, of flame-retardant substance(s)

chosen from phosphorus derivatives according to the invention, makes it possible to obtain a liquid composition or a syrup with an optimum viscosity for correctly impregnating the fibers of a fibrous substrate and makes it possible to obtain, after polymerization of the syrup, a thermoplastic composite material that has been rendered flame-retardant without halogen, which is fire-resistant and whose thermoplastic properties are conserved.

Technical Problem

The aim of the invention is thus to remedy at least one of the drawbacks of the prior art.

An objective of the present invention is also to have a liquid composition comprising a monomer, a (meth)acrylic polymer and one flame-retardant substance (FD1) chosen from a phosphorus-based additive having a sufficient low viscosity, that can be used in an impregnation process and/or a polymerization process.

The invention is especially directed toward proposing a composition or part made of thermoplastic material which has fire resistance such that the thermoplastic material has a limiting oxygen index (LOI) of greater than the 18, preferably greater than 20 and advantageously greater than 22.

The invention is especially directed toward proposing a mechanical part made of thermoplastic composite material which has fire resistance such that the composite material has a limiting oxygen index (LOI) of greater than 32, preferably greater than 40 and advantageously greater than 45.

The invention is also directed toward proposing a mechanical part made of thermoplastic composite material which has fire resistance such that the composite material has values, measured during a cone calorimeter test, of pHRR (peak heat release rate) and THR (total heat released) that are as low as possible, and of TTI (time to ignition) and TOF (time of flame-out) that are as high as possible. The level of fume emission and the amounts of CO and $CO_2$ should also be as low as possible.

The invention is also directed toward completely, correctly and uniformly wetting the fibrous substrate during the impregnation. Any defects of fiber wetting, for example by bubbles and voids, decrease the mechanical performance of the final composite part.

Another object of the present invention is to propose a process that can be performed at low cost and that allows industrial-scale manufacture of mechanical parts or structural elements made of thermoplastic polymer or thermoplastic composite material. In addition, the process should be easy and simple to perform using commercially available compounds. The manufacture of the composite parts should also be reproducible and fast, meaning short cycle times.

BRIEF DESCRIPTION OF THE INVENTION

It has been discovered, surprisingly, that a liquid composition comprising
a) a (meth)acrylic polymer (P1),
b) a (meth)acrylic monomer (M1),
c) at least one flame-retardant substance (FD1) chosen from a phosphorus-based additive comprising a dialkylphosphinic acid or diphosphinic acid or mixtures thereof or therewith;
said liquid (meth)acrylic syrup having a dynamic viscosity of between 10 mPa*s and 10 000 mPa*s, yields to a thermoplastic polymer composition after polymerization of said (meth)acrylic monomer (M1), said thermoplastic polymer composition is having a much better fire resistance as composition without flame-retardant substance (FD1).

It has also been discovered that a liquid composition comprising
a) a (meth)acrylic polymer (P1),
b) a (meth)acrylic monomer (M1),
c) at least one flame-retardant substance (FD1) chosen from a phosphorus-based additive comprising a dialkylphosphinic acid or diphosphinic acid or mixtures thereof or therewith;
said liquid (meth)acrylic syrup having a dynamic viscosity of between 10 mPa*s and 10 000 mPa*s, can be used to produce a thermoplastic polymer composition after polymerization of said (meth)acrylic monomer (M1), said thermoplastic polymer composition is having a much better fire resistance as composition without flame-retardant substance (FD1).

It has been discovered, surprisingly, that a liquid (meth)acrylic syrup for impregnating a fibrous substrate, said fibrous substrate consisting of long fibers, said syrup being characterized in that it comprises:
a) a (meth)acrylic polymer (P1),
b) a (meth)acrylic monomer (M1),
c) at least one flame-retardant substance (FD1) chosen from a phosphorus-based additive comprising a dialkylphosphinic acid or diphosphinic acid or mixtures thereof or therewith;
said liquid (meth)acrylic syrup having a dynamic viscosity of between 10 mPa*s and 10 000 mPa*s;
gives total and correct impregnation of the fibrous substrate and very good fire resistance after polymerization.

The Applicant has also discovered, surprisingly, that an impregnation process for impregnating a fibrous substrate, said fibrous substrate consisting of long fibers and said process comprising a step of impregnating said fibrous substrate with said liquid composition or liquid (meth)acrylic impregnation syrup, gives full and correct impregnation of the fibrous substrate.

It has also been discovered, surprisingly, that a process for manufacturing composite parts, comprising the following steps:
a) impregnating a fibrous substrate with such a liquid composition or (meth)acrylic syrup,
b) polymerizing the liquid (meth)acrylic syrup impregnating said fibrous substrate,
makes it possible to obtain thermoplastic composite parts with significantly improved fire-resistance properties, such that the parts made of composite material have a limiting oxygen index (LOI) of greater than 32, preferably greater than 40 and advantageously greater than 45, and additionally pHRR and THR values that are as low as possible and TTI and TOF values that are as high as possible.

Moreover, it has also been discovered that a composite part obtained by the manufacturing process, having significantly improved fire resistance, has nearly no defects such as voids between the fibrous substrate and the (meth)acrylic polymer.

DETAILED DESCRIPTION

According to a first aspect, the present invention relates to a liquid composition comprising:
a) a (meth)acrylic polymer (P1),
b) a (meth)acrylic monomer (M1), c) at least one flame-retardant substance (FD1) chosen from a phosphorus-based additive comprising a dialkylphosphinic acid or diphosphinic acid or mixtures thereof or therewith, said liquid composition is having a dynamic viscosity of between 10 mPa*s and 10 000 mPa*s at 25° C.

According to a second aspect, the present invention relates to a liquid (meth)acrylic syrup for impregnating a fibrous substrate, said fibrous substrate consisting of long fibers, and said syrup being characterized in that it comprises:
a) a (meth)acrylic polymer (P1),
b) a (meth)acrylic monomer (M1),
c) at least one flame-retardant substance (FD1) chosen from a phosphorus-based additive comprising a dialkylphosphinic acid or diphosphinic acid or mixtures thereof or therewith;

said liquid (meth)acrylic syrup having a dynamic viscosity of between 10 mPa*s and 10 000 mPa*s.

The term "fibrous substrate" as used refers to fabrics, felts or nonwovens that may be in the form of strips, laps, braids, locks or pieces.

The term "(meth)acrylic" as used refers to any type of acrylic or methacrylic monomer.

The term "PMMA" as used refers to homo- and copolymers of methyl methacrylate (MMA), the weight ratio of MMA in the PMMA being at least 70 wt % for the MMA copolymer.

The term "monomer" as used refers to a molecule that can undergo polymerization.

The term "polymerization" as used refers to the process of converting a monomer or a mixture of monomers into a polymer.

The term "thermoplastic polymer" as used refers to a polymer that turns to a liquid or becomes more liquid or less viscous when heated and that can take on new shapes by the application of heat and pressure.

The term "thermosetting polymer" as used refers to a prepolymer in a soft, solid or viscous state that changes irreversibly into an unmeltable, insoluble polymer network by curing.

The term "polymer composite" as used refers to a multicomponent material comprising several different phase domains, among which at least one type of phase domain is a continuous phase and in which at least one component is a polymer.

The term "flame-retardant substance" as used refers to a substance, additive or filler that is capable of retarding the ignition of a material so as to improve its fire resistance.

By the abbreviation "phr" is meant weight parts per hundred parts of resin. For example 15 phr of flame-retardant substance (FD1) in the composition means that 15 kg of flame-retardant substance (FD1) are added to 100 kg of composition.

The liquid composition or (meth)acrylic syrup according to the invention, for impregnating the fibrous substrate, especially comprises a (meth)acrylic monomer or a mixture of (meth)acrylic monomers, a (meth)acrylic polymer and at least one flame-retardant substance for retarding the ignition of the thermoplastic polymer matrix obtained after polymerization of the syrup.

The dynamic viscosity of the liquid composition or (meth) acrylic syrup is in a range from 10 mPa*s to 10000 mPa*s, preferably from 20 mPa*s to 7000 mPa*s and advantageously from 20 mPa*s to 5000 mPa*s. The viscosity of the syrup can be easily measured with a Rheometer or viscosimeter. The dynamic viscosity is measured at 25° C. If the liquid (meth) acrylic syrup has a Newtonian behaviour, meaning no shear thinning, the dynamic viscosity is independent of the shearing in a rheometer or the speed of the mobile in a viscosimeter. If the liquid composition has a non-Newtonian behaviour, meaning shear thinning the dynamic viscosity is measured at a shear rate of 1 $s^{-1}$ at 25° C.

As regards the liquid composition of the invention it comprises a (meth)acrylic monomer (M1), a (meth)acrylic polymer (P1) and at least one flame-retardant substance (FD1) chosen from a phosphorus-based additive. Once polymerized the (meth)acrylic monomer (M1) is transformed to a (meth)acrylic polymer (P2) comprising the monomeric units of (meth)acrylic monomer (M1).

The quantity of flame retardant substance (FD1) in the composition is at least 5 phr relative to the sum of (meth) acrylic monomer (M1) and (meth)acrylic polymer (P1) or sum of (meth)acrylic polymer (P1) (meth)acrylic polymer (P2). Preferably the quantity of flame retardant substance (FD1) in the composition is at least 10 phr, more preferably at least 15 phr, even more preferably at least 20 phr and advantageously at least 25 phr relative to the sum of (meth) acrylic monomer (M1) and (meth)acrylic polymer (P1) or sum of (meth)acrylic polymer (P1) (meth)acrylic polymer (P2).

The quantity of flame retardant substance (FD1) in the composition at most 150 phr of relative to the sum of (meth)acrylic monomer (M1) and (meth)acrylic polymer (P1) or sum of (meth)acrylic polymer (P1) (meth)acrylic polymer (P2). Preferably the quantity of flame retardant substance (FD1) in the composition is at most 130 phr, more preferably at most 110 phr, even more preferably at most 100 phr and advantageously at most 90 phr relative to the sum of (meth)acrylic monomer (M1) and (meth)acrylic polymer (P1) or sum of (meth)acrylic polymer (P1) (meth)acrylic polymer (P2).

The quantity flame retardant substance (FD1) in the composition is between 5 phr and 150 phr relative to the sum of (meth)acrylic monomer (M1) and (meth)acrylic polymer (P1) or sum of (meth)acrylic polymer (P1) (meth)acrylic polymer (P2). Preferably the quantity flame retardant substance (FD1) in the composition is between 10 phr and 130 phr, more preferably between 15 phr and 110 phr, even more preferably between 20 phr and 100 phr and advantageously at most 90 phr relative to the sum of (meth)acrylic monomer (M1) and (meth)acrylic polymer (P1) or sum of (meth) acrylic polymer (P1) (meth)acrylic polymer (P2).

As regards the (meth)acrylic monomer (M1), the monomer is chosen from acrylic acid, methacrylic acid, alkyl acrylic monomers, alkyl methacrylic monomers, hydroxyalkyl acrylic monomers and hydroxyalkyl methacrylic monomers, and mixtures thereof.

Preferably, the (meth)acrylic monomer (M1) is chosen from acrylic acid, methacrylic acid, hydroxyalkyl acrylic monomers, hydroxyalkyl methacrylic monomers, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

According to a preferred embodiment, at least 50% by weight and preferably at least 60% by weight of the (meth)acrylic monomer is methyl methacrylate.

According to a first more preferred embodiment, at least 50% by weight, preferably at least 60% by weight, more preferably at least 70% by weight, advantageously at least 80% by weight and even more advantageously 90% by weight of the monomer is a mixture of methyl methacrylate with optionally with at least one other monomer.

As regards the (meth)acrylic polymer (P1), mention may be made of polyalkyl methacrylates or polyalkyl acrylates. According to a preferred embodiment, the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a first preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer (P1) should be high, which means greater than 50 000 g/mol and preferably greater than 100 000 g/mol.

The weight-average molecular mass can be measured by size exclusion chromatography (SEC).

The (meth)acrylic polymer is fully soluble in the (meth)acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth)acrylic syrup is between 10 mPa*s and 10 000 mPa*s. The viscosity of the syrup can be readily measured with a rheometer or a viscometer. The dynamic viscosity is measured at 25° C.

Advantageously, the liquid (meth)acrylic syrup contains no additional voluntarily added solvent.

As regards the phosphorus-based additives, the flame-retardant substance is more particularly an additive comprising dialkylphosphinic acid or diphosphinic acid or mixtures thereof or therewith.

Preferably the flame-retardant substance (FD1) chosen from a phosphorus-based additive comprises a dialkylphosphinic acid of formula (1) or a dialkylphosphinic acid of formula (4)

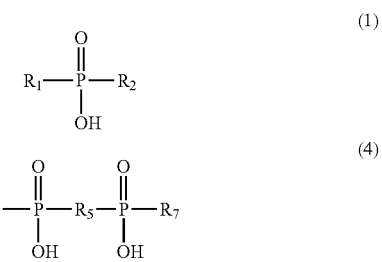

wherein $R_1$, $R_2$ are the same or different and are each independently $C_1$-$C_{18}$-alkyl, $C_2$-$C_{18}$-alkenyl, $C_6$-$C_{18}$-aryl, $C_7$-$C_{18}$-alkylaryl and wherein $R_6$, $R_7$ are the same or different and are each H, $C_1$-$C_{18}$-alkyl, $C_2$-$C_{18}$-alkenyl, $C_6$-$C_{18}$-aryl and/or $C_7$-$C_{18}$-alkylaryl, $R_5$ is $C_1$-$C_{18}$-alkylene, $C_2$-$C_{18}$-alkenylene, $C_6$-$C_{18}$-arylene, $C_7$-$C_{18}$-alkylarylene.

Preferably, $R_1$ and $R_2$ are the same or different and are each methyl, ethyl, n-propyl, isopropyl, n-butyl, isobutyl, tert-butyl, n-pentyl, isopentyl, n-hexyl, isohexyl and/or phenyl; $R^3$ is [independently of $R^1$ and $R^2$] methyl, ethyl, n-propyl, isopropyl, n-butyl, isobutyl, tert-butyl, n-pentyl, isopentyl, n-hexyl, isohexyl and/or phenyl.

The dialkylphosphinic acid of formula (1) can also be a mixture of two different dialkylphosphinic acids, where at least one of $R_1$ and $R_2$ is different.

More preferably, the dialkylphosphinic acid is diethylphosphinic acid, ethylpropylphosphinic acid, ethylbutylphosphinic acid, ethylpentylphosphinic acid, ethylhexylphosphinic acid, dipropylphosphinic acid, propylbutylphosphinic acid, propylpentylphosphinic acid, propylhexylphosphinic acid, dibutylphosphinic acid, butylpentylphosphinic acid, butylhexylphosphinic acid, dipentylphosphinic acid, pentylhexylphosphinic acid and/or dihexylphosphinic acid or mixtures thereof; and the alkylphosphonic acid is ethylphosphonic acid, propylphosphonic acid, butylphosphonic acid, pentylphosphonic acid or hexylphosphonic acid.

In a first embodiment the flame-retardant substance (FD1) comprises a mixture of dialkylphosphinic acid of formula (1) and an alkylphosphonic acid of formula (2)

wherein $R_3$ is $C_1$-$C_{18}$-alkyl, $C_2$-$C_{18}$-alkenyl, $C_6$-$C_{18}$-aryl or $C_7$-$C_{18}$-alkylaryl.

More preferably in the mixture according to the first embodiment, the dialkylphosphinic acid is diethylphosphinic acid, ethylpropylphosphinic acid, ethylbutylphosphinic acid, ethylpentylphosphinic acid, ethylhexylphosphinic acid, dipropylphosphinic acid, propylbutylphosphinic acid, propylpentylphosphinic acid, propylhexylphosphinic acid, dibutylphosphinic acid, butylpentylphosphinic acid, butylhexylphosphinic acid, dipentylphosphinic acid, pentylhexylphosphinic acid and/or dihexylphosphinic acid or mixtures thereof; and the alkylphosphonic acid is ethylphosphonic acid, propylphosphonic acid, butylphosphonic acid, pentylphosphonic acid or hexylphosphonic acid.

The mixture comprise 0.1 to 99.9 percent by weight of dialkylphosphinic acid of the formula (1) and 99.9 to 0.1 percent by weight of alkylphosphonic acid of the formula (2), preferably comprise 45 to 99.9 percent by weight of dialkylphosphinic acid of the formula (1) and 55 to 0.1 percent by weight of alkylphosphonic acid of the formula (2). More preferably, the mixture comprise 70 to 99.9 percent by weight of dialkylphosphinic acid of the formula (1) and 30 to 0.1 percent by weight of alkylphosphonic acid of the formula (2). Still more preferably, the mixture comprise 85 to 99.9 percent by weight of dialkylphosphinic acid of the formula (1) and 15 to 0.1 percent by weight of alkylphosphonic acid of the formula (2).

In a second embodiment the flame-retardant substance (FD1) comprises a mixture of dialkylphosphinic acid of formula (1) and a dialkylphosphinic acid of formula (4)

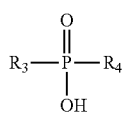

(3)

wherein $R_3$, $R_4$ are the same or different and are each $C_4$-$C_{18}$-alkyl, $C_2$-$C_{18}$-alkenyl, $C_6$-$C_{18}$-aryl and/or $C_7$-$C_{18}$-alkylaryl, with the proviso that at least one of the $R_3$ and $R_4$ radicals is different than R1 and R2.

Preferably, $R_3$ and $R_4$ are the same or different and are each methyl, ethyl, n-propyl, isopropyl, n-butyl, isobutyl, tert-butyl, n-pentyl, isopentyl, n-hexyl, isohexyl and/or phenyl, with the proviso that at least one of the $R_3$ and $R_4$ radicals is different than $R_1$ and $R_2$.

The mixtures preferably comprise 45 to 99.9 percent by weight of dialkylphosphinic acid of the formula (1) and 55 to 0.1 percent by weight of dialkylphosphinic acid of the formula (3). More preferably, the mixtures comprise 70 to 99.9 percent by weight of dialkylphosphinic acid of the formula (1) and 30 to 0.1 percent by weight of dialkylphosphinic acid of the formula (3).

The dialkylphosphinic acid (1) and (3) are preferably diethylphosphinic acid, ethylpropylphosphinic acid, ethylbutylphosphinic acid, ethylpentylphosphinic acid, ethylhexylphosphinic acid, dipropylphosphinic acid, propylbutylphosphinic acid, propylpentylphosphinic acid, propylhexylphosphinic acid, dibutylphosphinic acid, butylpentylphosphinic acid, butylhexylphosphinic acid, dipentylphosphinic acid, pentylhexylphosphinic acid and/or dihexylphosphinic acid.

In a third embodiment the flame-retardant substance (FD1) comprises a mixture of dialkylphosphinic acid of formula (1) and a diphosphinic acid of formula (4)

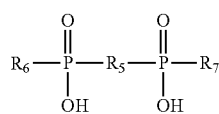

(4)

wherein $R_6$, $R_7$ are the same or different and are each H, $C_1$-$C_{18}$-alkyl, $C_2$-$C_{18}$-alkenyl, $C_6$-$C_{18}$-aryl and/or $C_7$-$C_{18}$-alkylaryl, $R_5$ is $C_4$-$C_{18}$-alkylene, $C_2$-$C_{18}$-alkenylene, $C_6$-$C_{18}$-arylene, $C_7$-$C_{18}$-alkylarylene.

Preferably $R_6$, $R_7$ are the same or different and are each H, methyl, ethyl, n-propyl, isopropyl, n-butyl, isobutyl, tert-butyl, n-pentyl, isopentyl, n-hexyl, isohexyl and/or phenyl; $R_1$, $R_2$ are the same or different and, independently of $R_6$ and $R_7$, are each methyl, ethyl, n-propyl, isopropyl, n-butyl, isobutyl, tert-butyl, n-pentyl, isopentyl, n-hexyl, isohexyl and/or phenyl, and $R_5$ is ethylene, butylene, hexylene or octylene. More preferably, $R_1$, $R_2$, $R_6$ and $R_7$ are the same or different and are each ethyl and/or butyl, and $R_5$ is ethylene or butylene The mixtures preferably comprise 45 to 99.9 percent by weight of diphosphinic acid of the formula (4) and 55 to 0.1 percent by weight of dialkylphosphinic acid of the formula (1). More preferably, the mixtures comprise 70 to 99.9 percent by weight of diphosphinic acid of the formula (1) and 30 to 0.1 percent by weight of dialkylphosphinic acid of the formula (3).

In a fourth embodiment the flame-retardant substance (FD1) comprises a mixture of diphosphinic acid of formula (4) and alkylphosphinic acid of formula (5)

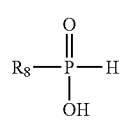

(5)

wherein $R_8$ are each $C_1$-$C_{18}$-alkyl, $C_2$-$C_{18}$-alkenyl, $C_6$-$C_{18}$-aryl and/or $C_7$-$C_{18}$-alkylaryl.

Preferably $R_6$, $R_7$ and $R_8$ are the same or different and are each H, methyl, ethyl, n-propyl, isopropyl, n-butyl, isobutyl, tert-butyl, n-pentyl, isopentyl, n-hexyl, isohexyl and/or phenyl; and $R_5$ is ethylene, butylene, hexylene or octylene.

The mixture of fourth embodiment preferably comprise 0.1 to 99.9 percent by weight of diphosphinic acid of the formula (4) and 99.1 to 0.1 percent by weight of alkylphosphinic acid of the formula (5). More preferably, the mixture comprise 50 to 99.9 percent by weight of diphosphinic acid of the formula (4) and 50 to 0.1 percent by weight of alkylphosphinic acid of the formula (5), advantageously the mixtures comprise 70 to 99.9 percent by weight of diphosphinic acid of the formula (4) and 30 to 0.1 percent by weight of alkylphosphinic acid of the formula (5), more advantageously the mixture comprise 85 to 99.9 percent by weight of diphosphinic acid of the formula (4) and 15 to 0.1 percent by weight of alkylphosphinic acid of the formula (5) and even more advantageously the mixture comprise 96 to 99.9 percent by weight of diphosphinic acid of the formula (4) and 4 to 0.1 percent by weight of alkylphosphinic acid of the formula (5).

Preferably the flame-retardant substance (FD1) comprising dialkylphosphinic acid or diphosphinic acid or mixtures thereof or therewith, is liquid at a temperature between 0° C. and 200° C. More preferably the flame-retardant substance (FD1) comprising alkylphosphinic acid or dialkylphosphinic acid or diphosphinic acid or mixtures thereof or therewith, is liquid at a temperature between 5° C. and 150° C., even more preferably between 8° C. and 120° C. and advantageously between 10° C. and 100° C.

The liquid composition according to the invention can also optionally comprise a second flame-retardant substance (FD2)

As regards the flame-retardant substance (FD2), it is chosen from:
- phosphorus-based additives such as phosphinates, diphosphinates, phosphonates, phosphates, red phosphorus, ammonium polyphosphates with a number of units n of at least 1000,
- hydrated mineral fillers such as metal hydroxides.

The overall weight content of flame-retardant substance(s) (FD1) and (FD2) together in the liquid composition or (meth)acrylic syrup is the same as defined before.

Such a content makes it possible to conserve an optimum dynamic viscosity of the liquid composition or (meth)acrylic syrup of between 10 mPa·s and 10 000 mPa·s at 25° C.

As regards the additionally phosphorus-based additives as second flame-retardant substance (FD2), the flame-retardant agent is more particularly chosen from the phosphinates or diphosphinates having formula (I) or (II) below:

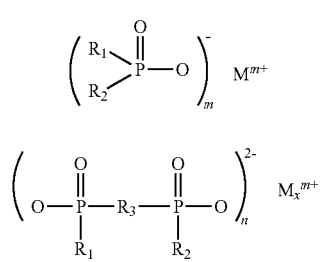

in which:
R$_1$ and R$_2$ denote a linear or branched C$_1$-C$_6$ alkyl and/or aryl group;
R$_3$ denotes a linear or branched C$_1$-C$_{10}$ alkylene, C$_6$-C$_{10}$ arylene, alkylarylene or arylalkylene group;
M denotes Mg, Ca, Al, Sb, Sn, Ge, Ti, Zn, Fe, Zr, Ce, Bi, Sr, Mn, Li, Na or K;
m is an integer between 1 and 4;
n is an integer between 1 and 4;
x is an integer between 1 and 4.

Two or more flame-retardant agents of formula (I) or (II) may also be combined. Advantageously, M denotes Ca, Al or Zn. Preferably, M denotes Al.

R$_1$ and R$_2$ are preferably alkyl groups, for instance methyl, ethyl, n-propyl, isopropyl, n-butyl, tert-butyl, n-pentyl and/or phenyl groups.

R$_3$ is preferably a methylene, ethylene, n-propylene, isopropylene, n-butylene, tert-butylene, n-pentylene, n-octylene or n-dodecylene group. It may also be a phenylene, methylphenylene, ethylphenylene, tert-butylphenylene, methylnaphthylene, phenylmethylene, phenylethylene, phenylpropylene or naphthalene group.

Preferably, a flame-retardant agent of formula (I) in which M denotes Al and R$_1$ and R$_2$ both denote a C$_1$-C$_6$ alkyl group is used. Preferably, R$_1$ and R$_2$ are both ethyl groups or alternatively an ethyl group and a methyl group, i.e. the flame-retardant agent corresponds to a product of formula (III) or (IV):

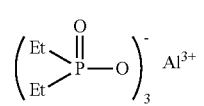

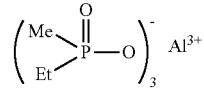

Preferably, to obtain good dispersion in the (meth) acrylic syrup, and homogeneous distribution in the fibers of the fibrous substrate at the time of impregnation, the flame-retardant agent is in the form of particles whose mean diameter D$_{50}$ is between 0.5 and 10 µm and advantageously between 1 and 5 µm. This mean particle diameter D$_{50}$ is measured by laser scattering granulometry, using an instrument of the Microtrac (trademark) range. For the estimation of the mean particle diameter, measurement is made of the mean volume diameter D$_{50}$ or D (v; 0.5), which corresponds to the particle size for which 50% of the sample has a size less than this size and 50% of the sample has a size greater than this size, or, in other words, the equivalent volume diameter at 50% cumulative volume. This size is also known as volume median diameter, which is related to the mass median diameter by the mass per unit volume of the particles, assuming a mass per unit volume independent of the size of the particles.

As regards the hydrated mineral fillers as second flame-retardant substance (FD2), they are essentially metal hydroxides, which are more particularly in the form of aluminum trihydrate (Al(OH)$_3$) or magnesium hydroxide (Mg(OH)). It is preferably aluminum trihydrate (Al(OH)$_3$).

Metal hydroxides undergo endothermic dehydration during their thermal degradation. The release of water cools the composite material and dilutes the gases in the region of the flames, thus causing a delay in ignition. Furthermore, following their thermal degradation, a layer of metal oxide Al$_2$O or MgO which acts as a heat shield forms in the composite material.

Preferably, to obtain good dispersion in the (meth) acrylic syrup, and homogeneous distribution in the fibers of the fibrous substrate at the time of impregnation, the flame-retardant metal hydroxide is in the form of particles whose mean diameter D$_{50}$ is between 0.5 and 10 µm and advantageously between 1 and 5 µm. This mean particle diameter D$_{50}$ is measured by laser scattering granulometry, using an instrument of the Microtrac (trademark) range. For the estimation of the mean particle diameter, measurement is made of the mean volume diameter D$_{50}$ or D (v; 0.5), which corresponds to the particle size for which 50% of the sample has a size less than this size and 50% of the sample has a size greater than this size, or, in other words, the equivalent volume diameter at 50% cumulative volume. This size is also known as volume median diameter, which is related to the mass median diameter by the mass per unit volume of the particles, assuming a mass per unit volume independent of the size of the particles.

The flame-retardant additives or the flame-retardant fillers may be used alone or in combination in the (meth)acrylic syrup. The overall content of these substances in the (meth) acrylic syrup should not, however, exceed 50% by weight and is preferably less than 30% by weight, so as to conserve the viscosity of the syrup.

The flame-retardant substance(s) may also be combined with at least one other additive or filler for reinforcing its flame-retardant efficacy. The (meth)acrylic syrup may thus optionally comprise at least one other additive or filler, chosen, for example, from the following list:
- additives such as fumed silica or clays/bentonites;
- inorganic fillers such as magnesium carbonate, calcium carbonate, magnesium oxide, calcium oxide, hydrotalcite, dihydrotalcite, calcium hydroxide, talc (dihydroxylated magnesium silicate), or metal oxides, for instance zinc oxide, aluminum oxide, titanium oxides or antimony trioxide, or antimony tartrate.

These additives or fillers impede the diffusion of the combustible gases derived from pyrolysis during a fire and consequently make it possible to improve the fire resistance of the final composite material and to reinforce the efficacy of the flame-retardant substance(s) incorporated into the (meth)acrylic syrup.

A filler is not considered to be an additive in the context of the present invention.

In order to conserve a dynamic viscosity of the liquid composition or (meth)acrylic syrup such that it allows good impregnation of the fibrous substrate and to conserve the thermoplastic properties of the matrix obtained after polymerization of the fibrous substrate preimpregnated with syrup, the compounds of the syrup are incorporated in the following mass percentages:

The (meth)acrylic monomer(s) (M1) in the liquid composition or (meth)acrylic syrup are present in proportions of between 40% and 90% by weight and preferably between 45% and 85% by weight of the composition comprising (meth)acrylic monomer(s) (M1) and (meth)acrylic polymer (P1).

The (meth)acrylic polymer(s) (P1) in the liquid composition or (meth)acrylic syrup are present in a proportion of at least 1% by weight, preferably at least 5% and advantageously at least 10% by weight of the composition comprising (meth)acrylic monomer(s) (M1) and (meth)acrylic polymer (P1).

The (meth)acrylic polymer(s) (P1) in the liquid (meth)acrylic syrup are present in a proportion of not more than 50% by weight, preferably not more than 40% and advantageously not more than 30% by weight of the composition comprising (meth)acrylic monomer(s) (M1) and (meth)acrylic polymer (P1).

All the additives and fillers are added to the liquid (meth)acrylic syrup before the impregnation.

As regards the process for manufacturing the liquid composition or (meth)acrylic syrup, a first step consists in preparing a first syrup comprising the (meth)acrylic monomer (M1) or mixture of (meth)acrylic monomers and a (meth)acrylic polymer (P1). The flame-retardant substance(s) are then added to the first syrup, in the proportions indicated above to conserve a dynamic viscosity of between 10 mPa*s and 10 000 mPa*s, at 25° C.

As regards the process for impregnating the fibrous substrate, it comprises a step of impregnating the fibrous substrate with the liquid composition or (meth)acrylic syrup.

This impregnation step can take place in a mold or closed mold.

If the viscosity of the liquid (meth)acrylic syrup at a given temperature is slightly too high for the impregnation process, it is possible to heat the syrup so as to have a more liquid syrup for sufficient wetting and correct and complete impregnation of the fibrous substrate.

As regards the fibrous substrate, mention may be made of fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear long fibers. The fibers may be discontinuous or continuous. The fibers may be arranged randomly or parallel to each other, in the form of a continuous filament. A fiber is defined by its aspect ratio, which is the ratio between the length and diameter of the fiber. The fibers used in the present invention are long fibers or continuous fibers. The fibers have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibers, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibers or mixtures thereof, an assembly of the two-dimensional form in the third dimension.

The origins of the fibrous material may be natural or synthetic. As natural material one can mention plant fibers, wood fibers, animal fibers or mineral fibers.

Natural fibers are, for example, sisal, jute, hemp, flax, cotton, coconut fibers, and banana fibers. Animal fibers are, for example, wool or hair.

As synthetic material, mention may be made of polymeric fibers chosen from fibers of thermosetting polymers, of thermoplastic polymers or mixtures thereof.

The polymeric fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be chosen from glass fibers, especially of E, R or S2 type, carbon fibers, boron fibers or silica fibers.

The fibrous substrate of the present invention is chosen from plant fibers, wood fibers, animal fibers, mineral fibers, synthetic polymeric fibers, glass fibers and carbon fibers, and mixtures thereof.

Preferably, the fibrous substrate is chosen from mineral fibers.

The fibers of the fibrous substrate have a diameter between 0.005 μm and 100 μm, preferably between 1 μm and 50 μm, more preferably between 5 μm and 30 μm and advantageously between 10 μm and 25 μm.

Preferably, the fibers of the fibrous substrate of the present invention are chosen from continuous fibers (meaning that the aspect ratio does not necessarily apply as for long fibers) for the one-dimensional form, or for long or continuous fibers for the two-dimensional or three-dimensional form of the fibrous substrate.

According to an additional aspect, the invention relates to a thermoplastic polymer composition made from the liquid composition. The thermoplastic polymer composition is obtained by polymerization the (meth)acrylic monomer (M1) or mixture of (meth)acrylic monomers in the liquid composition.

In one embodiment the thermoplastic polymer composition is obtained by a cast sheet polymerization.

According to another additional aspect, the invention relates to a polymeric composite material comprising a thermoplastic (meth)acrylic matrix and a fibrous substrate used as reinforcement, in which the fibrous substrate consists of long fibers, said composite material being characterized in that the thermoplastic (meth)acrylic matrix is obtained after polymerization of said fibrous substrate pre-impregnated with said liquid composition or (meth)acrylic syrup.

Another aspect of the present invention is a process for manufacturing mechanical or structured parts or products, comprising the following steps:
  a) impregnating a fibrous substrate with the liquid composition or (meth)acrylic syrup according to the invention,
  b) polymerizing the liquid composition or (meth)acrylic syrup impregnating said fibrous substrate.

As regards the process for manufacturing composite parts, various processes could be used for preparing parts. Mention may be made of infusion, vacuum bag molding, pressure bag molding, autoclave molding, resin transfer molding (RTM), reaction injection molding (RIM), reinforced reaction injection molding (R-RIM) and variants thereof, press molding or compression molding.

The preferred manufacturing processes for manufacturing composite parts are processes according to which the liquid (meth)acrylic syrup is transferred to the fibrous substrate by impregnation of the fibrous substrate in a mold.

One advantage of this process is the large amount of fibrous material in the composite.

As regards the use of the mechanical parts made of composite material thus manufactured, mention may be made of automotive applications, transport applications such as buses or lorries, nautical applications, railroad applications, sport, aeronautic and aerospace applications, photovoltaic applications, computer-related applications, construction and building applications, telecommunication applications and wind energy applications.

The mechanical part made of composite material is especially a motor vehicle part, boat part, bus part, train part, sport article, plane or helicopter part, space ship or rocket part, photovoltaic module part, a material for construction or building, wind turbine part, furniture part, construction or building part, telephone or cellphone part, computer or television part, or printer or photocopier part.

The mechanical parts or structural elements, obtained after impregnation of a fibrous substrate with the (meth)acrylic syrup and polymerization, underwent fire-resistance tests and have good properties, as is illustrated by the examples below. An additional advantage of the thermoplastic composite material obtained by means of the invention lies in the fact that the (meth)acrylic matrix subjected to a fire gives off a smaller amount of toxic fumes than a phenolic resin used hitherto for making thermosetting composite materials and which especially gives off carbon monoxide. Furthermore, the fumes given off by the combustion of a (meth)acrylic resin are much less opaque than the fumes given off by the combustion of polyester resins or epoxides.

The mechanical parts or structural elements made of composite material obtained after impregnation of a fibrous substrate with the (meth)acrylic syrup and polymerization have a limiting oxygen index LOI of greater than 32, preferably greater than 40 and advantageously greater than 45.

The limiting oxygen index (LOI) is defined as being the minimum percentage of oxygen in an oxygen-nitrogen mixture ($N_2/O_2$) in order for a sustained combustion of a specimen to be observed under the test conditions specified by standard ISO 4589. The LOI thus measures the ease with which a polymer can ignite on contact with a flame. The higher the LOI value, the less the material has a tendency to ignite.

For an LOI<21, the material is combustible, which is the case for PMMA with an LOI value of 17.3.

For an LOI>21, the material is self-extinguishing (it does not burn in air).

For an LOI=100, the material is totally incombustible.

Examples

First Step: Preparation of a Liquid Composition or the (Meth)Acrylic Syrup

A liquid composition is prepared by dissolving 20% by weight of the PMMA (BS520, a copolymer of MMA comprising ethyl acrylate as comonomer) as P1 in 80% by weight of methyl methacrylate as M1, which is stabilized with HQME (hydroquinone monomethyl ether).

To this liquid composition are added different flame retardant substances as (FD1) or mixtures comprising. As flame retardant (FD1) Exolit EP150 from the company Clariant is used. As flame retardant (FD2) phosphinate OP930 from the company Clariant, with a diameter D50 of 2.5 μm is used.

The comparative example 1 has no added flame retardant substances.

Polymerisation of respective compositions as cast sheets with a thickness of 4.5 mm is made by adding to 100 parts by weight of the liquid composition (based on M1 and P1 only) is added 1 part by weight of benzoyl peroxide (BPO—Luperox A75 from the company Arkema).

Samples of 1 cm*20 cm are cut from the sheets.

The limiting oxygen index (LOI) of the respective sample is measured.

TABLE 1

| compositions and LOI results | | | |
| --- | --- | --- | --- |
| | FD1 [phr] | FD2 [phr] | LOI [%] |
| Comparative example 1 | 0 | 0 | 17.6 |
| Example 1 | 30 | 0 | 23.0 |
| Example 2 | 30 | 30 | 28.0 |

The LOI increases significantly with the examples according to the invention, passing the atmospheric oxygen quantity.

Second Step: Impregnation of a Fibrous Substrate and Polymerization

The liquid compositions can be used for the impregnation of fibrous substrate, in order to obtain a thermoplastic composite material with good flame retardant properties.

The invention claimed is:
1. A polymeric composite material comprising a thermoplastic (meth)acrylic matrix and a fibrous substrate used as reinforcement, in which the fibrous substrate consists of long fibers, said thermoplastic (meth)acrylic matrix being obtained after polymerization of said fibrous substrate with a liquid composition, said liquid composition comprising
  a) a (meth)acrylic polymer (P1),
  b) a (meth)acrylic monomer (M1),
  c) between 100 phr and 150 phr relative to the sum of (meth)acrylic monomer (M1) and (meth)acrylic polymer (P1) of at least one flame-retardant substance (FD1) chosen from a phosphorus-based additive comprising a dialkylphosphinic acid or diphosphinic acid or mixtures thereof or therewith, wherein said FD1 is a liquid at a temperature of between 8° C. and 200° C., said liquid composition is having a dynamic viscosity of between 10 mPa*s and 10,000 mPa*s at 25° C.

2. The polymeric composite material as claimed in claim 1, wherein the phosphorus-based additive is between 100 phr and 110 phr relative to the sum of (meth)acrylic monomer (M1) and (meth)acrylic polymer (P1).

3. The polymeric composite material according to claim 1, wherein the (meth)acrylic polymer comprises at least 50% by weight of methyl methacrylate (MMA) monomer units.

4. The polymeric composite material according to claim 1, wherein at least 50% by weight of the (meth)acrylic monomer (M1) is methyl methacrylate.

5. The polymeric composite material as claimed in claim 1, wherein a thermoplastic polymer composition obtained by polymerization of the liquid composition has a limiting oxygen index (LOI) of greater than 18.

6. The polymeric composite material according to claim 1, wherein the phosphorus-based additive comprises a diphosphinic acid of formula (4)

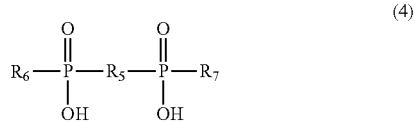

(4)

wherein $R_6$, $R_7$ are the same or different and are each H, $C_1$-$C_{18}$-alkyl, $C_2$-$C_{18}$-alkenyl, $C_6$-$C_{18}$-aryl and/or $C_7$-$C_{18}$-alkylaryl, $R_5$ is $C_1$-$C_{18}$-alkylene, $C_2$-$C_{18}$-alkenylene, $C_6$-$C_{18}$-arylene, $C_7$-$C_{18}$-alkylarylene.

7. The polymeric composite material according to claim 6, wherein the phosphorus-based additive comprises a mixture of diphosphinic acid of formula (4) and further comprises a alkylphosphinic acid of formula (5)

(5)

wherein $R_8$ are each $C_1$-$C_{18}$-alkyl, $C_2$-$C_{18}$-alkenyl, $C_6$-$C_{18}$-aryl and/or $C_7$-$C_{18}$-alkylaryl.

8. The polymeric composite material according to claim 1, wherein the composition comprises a second flame-retardant substance (FD2), said flame-retardant substance (FD2), it is chosen from:
   phosphorus-based additives selected from the group consisting of phosphinates, diphosphinates, phosphonates, phosphates, red phosphorus, and ammonium polyphosphates with a number of units n of at least 1000, hydrated mineral fillers, and metal hydroxides.

9. The polymeric composite material according to claim 8, said flame-retardant substance (FD2), it is chosen from:
   phosphinates or diphosphinates having formula (I) or (II) below:

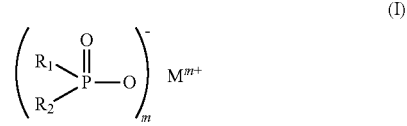

(I)

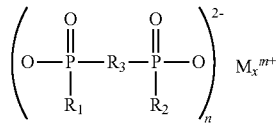

(II)

in which:
   $R_1$ and $R_2$ denote a linear or branched $C_1$-$C_6$ alkyl and/or aryl group;
   $R_3$ denotes a linear or branched $C_1$-$C_{10}$ alkylene, $C_6$-$C_{10}$ arylene, alkylarylene or arylalkylene group;
   M denotes Mg, Ca, Al, Sb, Sn, Ge, Ti, Zn, Fe, Zr, Ce, Bi, Sr, Mn, Li, Na or K;
   m is an integer between 1 and 4;
   n is an integer between 1 and 4;
   x is an integer between 1 and 4.

10. The polymeric composite material according to claim 1, wherein the (meth)acrylic monomer (M1) is chosen from acrylic acid, methacrylic acid, alkyl acrylic monomers and alkyl methacrylic monomers, and mixtures thereof, the alkyl group containing from 1 to 22 linear, branched or cyclic carbons.

11. The polymeric composite material as claimed in claim 10, wherein the (meth)acrylic monomer is selected from the group consisting of methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

12. The polymeric composite material according to claim 1, wherein the phosphorus-based additive comprises a dialkylphosphinic acid of formula (1):

(1)

wherein $R_1$, $R_2$ are the same or different and are each independently $C_1$-$C_{18}$-alkyl, $C_2$-$C_{18}$-alkenyl, $C_6$-$C_{18}$-aryl, $C_7$-$C_{18}$-alkylaryl.

13. The polymeric composite material according to claim 12, wherein the phosphorus-based additive comprises a mixture of dialkylphosphinic acid of formula (1) and further comprises an alkylphosphonic acid of formula (2)

(2)

wherein $R_3$ is $C_1$-$C_{18}$-alkyl, $C_2$-$C_{18}$-alkenyl, $C_6$-$C_{18}$-aryl or $C_7$-$C_{18}$-alkylaryl.

14. The polymeric composite material according to claim 12, wherein the phosphorus-based additive comprises a mixture of dialkylphosphinic acid of formula (1) and claim 1 dialkylphosphinic acid of formula (3)

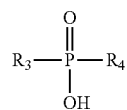

(3)

wherein $R_3$, $R_4$ are the same or different and are each $C_1$-$C_{18}$-alkyl, $C_2$-$C_{18}$-alkenyl, $C_6$-$C_{18}$-aryl and/or $C_7$-$C_{18}$-alkylaryl, with the proviso that at least one of the $R_3$ and $R_4$ radicals is different than $R_1$ and $R_2$.

15. The polymeric composite material according to claim 12, wherein the phosphorus-based additive comprises a mixture of dialkylphosphinic acid of formula (1) and further comprises a diphosphinic acid of formula (4)

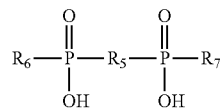

(4)

wherein $R_6$, $R_7$ are the same or different and are each H, $C_1$-$C_{18}$-alkyl, $C_2$-$C_{18}$-alkenyl, $C_6$-$C_{18}$-aryl and/or $C_7$-$C_{18}$-alkylaryl, $R_5$ is $C_1$-$C_{18}$-alkylene, $C_2$-$C_{18}$-alkenylene, $C_6$-$C_{18}$-arylene, $C_7$-$C_{18}$-alkylarylene.

16. A mechanical part or structural element made of composite material as claimed in claim 1.

17. The mechanical part or structural element as claimed in claim 16, said part being a motor vehicle part, boat part, train part, sport article, plane or helicopter part, space ship or rocket part, photovoltaic module part, wind turbine part, furniture part, construction or building part, telephone or cellphone part, computer or television part, printer or photocopier part.

* * * * *